J. T. WRIGHT.
Seed-Dropper.
No. 169,072. Patented Oct. 19, 1875.
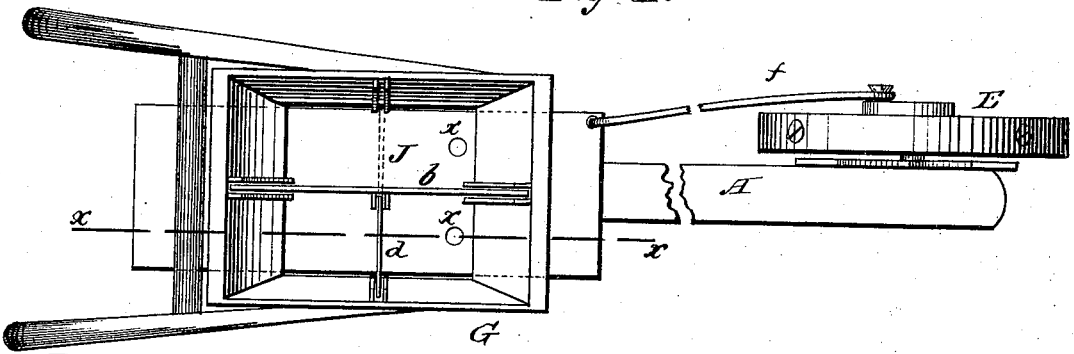
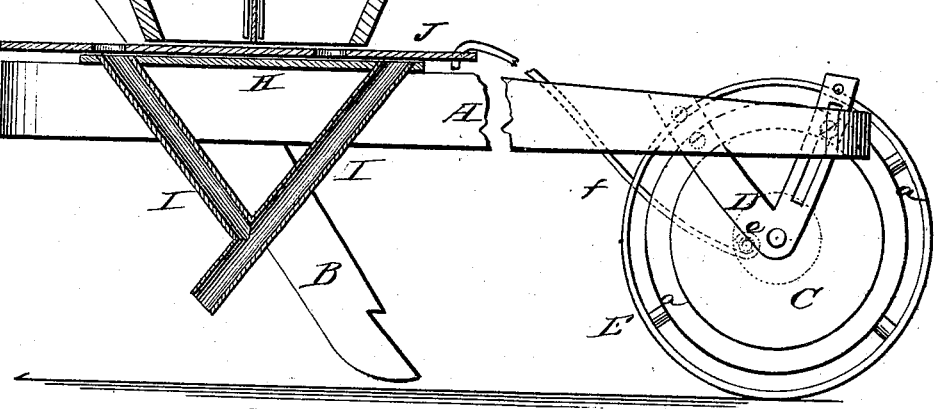
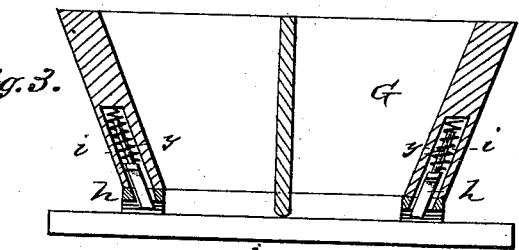
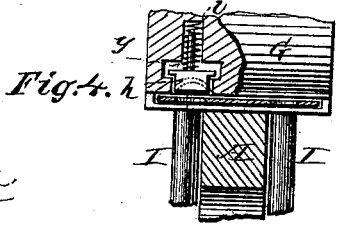

UNITED STATES PATENT OFFICE.

JOHN T. WRIGHT, OF COLUMBIA, TENNESSEE.

IMPROVEMENT IN SEED-DROPPERS.

Specification forming part of Letters Patent No. 169,072, dated October 19, 1875; application filed July 1, 1875.

*To all whom it may concern:*

Be it known that I, J. T. WRIGHT, of Columbia, in the county of Maury and State of Tennessee, have invented certain new and useful Improvements in Seed-Droppers; and I do hereby declare that the following is a full, clear, and exact description thereof, reference being had to the accompanying drawings and to the letters of reference marked thereon, which form part of this specification.

The nature of my invention consists in the construction and arrangement of a planter for planting corn and beans, peas, or pumpkin-seed, and distributing fertilizer at the same time, as will be hereinafter more fully set forth.

In order to enable others skilled in the art to which my invention appertains to make and use the same, I will now proceed to describe its construction and operation, referring to the annexed drawing, in which—

Figure 1 is a plan view, and Fig. 2 a longitudinal section, of my planter. Figs. 3 and 4 are enlarged sections of the hopper.

A represents the plow-beam, with the plow-standard B near its rear end, and wheel C at the front end. The wheel C is pivoted in an adjustable brace, D, attached to the plow-beam, so as to be raised and lowered, as required, and the wheel is provided with an additional removable tire, E, by means of which it can be made of larger or smaller diameter, the extra tire E being attached by means of radial pins $a$ $a$, as shown in Fig. 2. G is the hopper, divided by a partition, $b$, in two longitudinal compartments, and one of these is, by a transverse partition, $d$, divided into two smaller compartments, the hopper being thus adapted for fertilizer on one side, and on the other side for corn and for beans, peas or pumpkin seed, all to be planted at one or separate times. The bottom H of the hopper extends in front and rear thereof, and has at each end two tubes, I, inclined toward each other, and connected together, as shown. J is the dropping-slide, resting on the bottom H, and operated by a pitman, $f$, from a crank-pin, $e$, on the wheel C. This slide has two holes, $x$ $x$, at each end corresponding with the tubes. The seed-compartments of the hopper are each provided with a cut-off, $h$, inserted in mortises made in the front and rear sides of the hopper, and each actuated by means of a spiral spring, $i$, surrounding a stem, $y$, projecting upward from the cut-off.

With this construction the corn and fertilizer are dropped at one time, and the other seed are dropped between the hills of corn. By a change in the arrangement of the tubes and discharge-openings they may all be dropped at one time.

The distance between the hills is regulated by the size of the wheel C—that is, by putting on or taking off the tire or rim E.

Having thus fully described my invention, what I claim as new, and desire to secure by Letters Patent, is—

The combination, with the beam A, of the adjustable brace D, wheel C provided with the removable tire or rim E, the pitman $f$, slide J, and tubes I I, constructed and arranged to operate substantially as and for the purpose set forth.

In testimony that I claim the foregoing as my own I affix my signature in the presence of two witnesses.

JOHN THOMAS WRIGHT.

Witnesses:
WATTS F. EMBRY,
W. E. SANSOM.